United States Patent
Kang et al.

(10) Patent No.: US 10,266,208 B2
(45) Date of Patent: Apr. 23, 2019

(54) FRONT VEHICLE BODY REINFORCING STRUCTURE

(71) Applicants: HYUNDAI MOTOR COMPANY, Seoul (KR); KIA MOTORS CORPORATION, Seoul (KR)

(72) Inventors: SeungMin Kang, Suwon-si (KR); Yunho Lee, Seoul (KR); Yong Kew Kim, Gwangmyung-si (KR); Hyeyeon Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/818,103

(22) Filed: Nov. 20, 2017

(65) Prior Publication Data

US 2018/0304933 A1    Oct. 25, 2018

(30) Foreign Application Priority Data

Apr. 21, 2017 (KR) .................. 10-2017-0051474

(51) Int. Cl.
*B62D 25/08* (2006.01)
*B62D 27/02* (2006.01)

(52) U.S. Cl.
CPC ......... *B62D 25/081* (2013.01); *B62D 25/082* (2013.01); *B62D 27/02* (2013.01)

(58) Field of Classification Search
CPC .. B62D 25/082; B62D 25/085; B62D 21/152; B62D 2021/009; B62D 2021/0023
See application file for complete search history.

(56) References Cited

U.S. PATENT DOCUMENTS

| 7,469,956 | B2 | 12/2008 | Yasuhara et al. | |
|---|---|---|---|---|
| 8,991,907 | B1 * | 3/2015 | Kim ..................... | B62D 25/082 296/193.09 |
| 2005/0077711 | A1 * | 4/2005 | Yasui .................. | B62D 21/152 280/735 |
| 2007/0252412 | A1 * | 11/2007 | Yatsuda .............. | B62D 25/082 296/193.09 |

(Continued)

FOREIGN PATENT DOCUMENTS

| CA | 2703572 C * | 4/2013 | ............. B60R 19/34 |
|---|---|---|---|
| DE | 102009042064 A1 * | 3/2011 | ........... B62D 25/082 |

(Continued)

*Primary Examiner* — Hilary L Gutman
(74) *Attorney, Agent, or Firm* — Morgan Lewis & Bockius LLP

(57) ABSTRACT

A front vehicle body reinforcing structure of a vehicle includes a front side member formed to extend along a longitudinal direction of the vehicle, disposed on both right and left sides along a width direction of the vehicle, and formed by coupling a front side inner member disposed on an inner side of the vehicle and a front side outer member disposed on an outer side of the vehicle. A front end portion of the front side outer member is cut away and positioned behind a front end portion of the front side inner member; a side outer member coupled to a cut-away portion of the front side outer member; and a fender apron member disposed on an upper side in a height direction of the vehicle than the front side member and coupled to the side outer member, thereby improving front collision resistance performance.

10 Claims, 3 Drawing Sheets

(56) References Cited

U.S. PATENT DOCUMENTS

| | | | |
|---|---|---|---|
| 2013/0241233 A1* | 9/2013 | Ohnaka | B62D 21/152 |
| | | | 296/187.1 |
| 2013/0320710 A1* | 12/2013 | Watanabe | B62D 25/082 |
| | | | 296/187.09 |
| 2014/0062106 A1* | 3/2014 | Han | B60R 19/34 |
| | | | 293/133 |
| 2016/0039373 A1* | 2/2016 | Yamada | B60R 19/24 |
| | | | 293/132 |
| 2016/0052554 A1* | 2/2016 | Ozawa | B62D 21/152 |
| | | | 296/187.09 |
| 2016/0185392 A1* | 6/2016 | Higuchi | B62D 25/085 |
| | | | 180/312 |
| 2016/0207573 A1* | 7/2016 | Kitakata | B62D 21/152 |
| 2017/0113726 A1* | 4/2017 | Matsushima | B62D 21/152 |
| 2017/0113727 A1* | 4/2017 | Nakamoto | B60R 19/34 |
| 2017/0113735 A1* | 4/2017 | Kawabe | B62D 25/08 |
| 2017/0210425 A1* | 7/2017 | Sekiguchi | B62D 25/08 |
| 2017/0217501 A1* | 8/2017 | Takeda | B62D 21/152 |

FOREIGN PATENT DOCUMENTS

| | | | | |
|---|---|---|---|---|
| DE | 102012023787 A1 * | 6/2014 | | B62D 25/082 |
| DE | 102013014720 A1 * | 3/2015 | | B62D 25/082 |
| WO | WO-2015082793 A1 * | 6/2015 | | B62D 25/00 |
| WO | WO-2015141481 A1 * | 9/2015 | | B62D 25/082 |
| WO | WO-2017101513 A1 * | 6/2017 | | B60R 19/34 |

\* cited by examiner

FRONT VEHICLE BODY REINFORCING STRUCTURE

CROSS-REFERENCE TO RELATED APPLICATION

This application is based on and claims the benefit of priority to Korean Patent Application No. 10-2017-0051474 filed on Apr. 21, 2017 with the Korean Intellectual Property Office, the entire contents of which are incorporated herein by reference.

TECHNICAL FIELD

The present disclosure relates to a front vehicle body reinforcing structure, and, more particularly, a front vehicle body reinforcing structure capable of enhancing reaction performance against both a head-on collision and a front small overlap collision of a vehicle.

BACKGROUND

Generally, a front vehicle body is disposed at a front portion of the vehicle, and is formed in a frame structure capable of forming an engine compartment. Such a front vehicle body includes a front end module which forms a front end of the engine compartment in which a cooling module, a head lamp, etc., are installed, a front fender apron member which forms both left and right sides of the engine compartment and provides a space in which a suspension system is disposed and wheels are installed, and a dash panel which is disposed behind the engine compartment and partitions a passenger compartment from the engine compartment.

Further, a front end member extending in a longitudinal direction of the vehicle is disposed under the engine compartment in left and right directions in a widthwise direction of the vehicle, thereby reinforcing the structural strength of the front vehicle body. A sub-frame configured to support an engine and a transmission, which are installed in the engine compartment and a suspension system, is disposed at the bottom of the front end member of the vehicle.

The front end portion of the front side member is mounted on a bumper beam extended along the width direction of the vehicle to improve the front collision performance, and the bumper beam is connected with the front end portion along the length direction of the vehicle through a crash box.

In a case where a vehicle having a front vehicle body with the above structure collides head-on with small overlap with an collision object such as an obstacle or other vehicle while driving, that is, in a case where an collision object such as a small overlap barrier deviated to one side along the width direction of the vehicle and collides with the outside portion of the vehicle body, the collision object displaces the front side member to collide with the relative weak outer portion of the vehicle body, so that the vehicle does not effectively cope with a front small-overlap collision, thereby not safely protecting the passenger and also causing excessive collision damage to the vehicle body.

In order to solve the above-described drawbacks, inventions have been proposed for reinforcing the outer portion of a vehicle body to cope with a small overlap collision.

For example, a structure in which a front end portion of a front fender apron member was extended to a front end portion of a front side member and connected to each other by a connecting member, or a structure in which a reinforcement member for preventing infiltration of an collision object was mounted on the outside of a front side member have been proposed, but the structures were not effective in the front small overlap collision performance.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a front vehicle body reinforcing structure having advantages that, in the frontal collision or small overlap collision of the vehicle, the front side member and the fender apron member may absorb the impact energy effectively by receiving the impact energy simultaneously, and the impact energy absorbed by the front side member and the fender apron member is appropriately dispersed to other parts of the vehicle body, thereby improving the impact stability.

A front vehicle body reinforcing structure according to an exemplary embodiment of the present disclosure may include a front side member formed to extend along a longitudinal direction of the vehicle, disposed on both right and left sides along a width direction of the vehicle, and formed by coupling a front side inner member disposed on an inner side in the width direction of the vehicle and a front side outer member disposed on an outer side of the vehicle, in which a front end portion of the front side outer member along the longitudinal direction of the vehicle is cut away and positioned behind the front end portion of the front side inner member along the longitudinal direction of the vehicle; a side outer member coupled to the cut-away portion of the front side outer member; and a fender apron member disposed on an upper side in a height direction of the vehicle than the front side member and coupled to the side outer member.

The front side inner member and the front side outer member may form a closed cross section of a rectangular shape.

The side outer member may include an outer surface along the width direction of the vehicle; an upper surface bent inwardly along the width direction of the vehicle and extended from an upper edge of the outer surface along the height direction of the vehicle, and disposed at an upper side along the height direction of the vehicle; and a lower surface bent inwardly along the width direction of the vehicle and extended from a lower edge of the outer surface along the height direction of the vehicle, disposed at a lower side along the height direction of the vehicle and parallel to the upper surface.

A U-shaped cross section may be formed by the outer surface, the upper surface and the lower surface of the side outer member.

The side outer member may further include a slanted surface that is inclined to a rearward along the length direction of the vehicle from the outer surface and to an inward in the width direction of the vehicle.

A rear end portion of the slanted surface along the length direction of the vehicle may be joined to the front side outer member.

Width of the side outer member along the width direction of the vehicle is greater than width of the front side outer member, so that, when the side outer member is coupled to the cut-away portion of the front side outer member, the outer surface along the width direction of the vehicle may be located outside the outer surface of the front side outer member along the width direction of the vehicle.

The fender apron member may include a fender apron inner member located inside along the width direction of the vehicle; and a fender apron outer member located outside along the width direction of the vehicle.

The front end portion of the fender apron inner member along the length direction of the vehicle may be bent outwardly in the width direction of the vehicle to form a coupling flange and the coupling flange may be joined to the slanted surface of the side outer member.

The front end portion along the length direction of the vehicle of the fender apron outer member may be joined to an outer surface of the side outer member along the width direction of the vehicle.

By the front vehicle body reinforcing structure according to an exemplary embodiment of the present disclosure, the front side member is composed of a front side inner member and a front side outer member, the front end portion of the front side outer member along the longitudinal direction of the vehicle is cut away and the side outer member is joined to the cut-away portion, the side outer member is joined to the front end portion of the fender apron upper member along the longitudinal direction of the vehicle, so that the front side member and the fender apron member receive an impact load simultaneously to absorb the impact load effectively while being deformed at the time of a frontal collision of the vehicle or a frontal small overlap collision, and, at the same time, the impact load transmitted to each member is effectively dispersed to other parts of the vehicle body, thereby improving the collision stability of the passenger.

DETAILED DESCRIPTION

Hereinafter, an exemplary embodiment of the present disclosure will now be described in detail with reference to the accompanying drawing.

Figure 1:
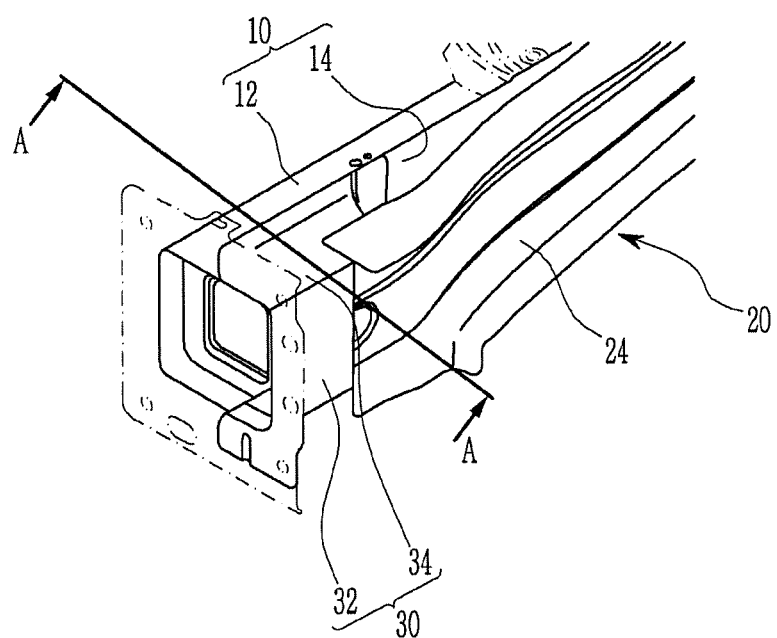
FIG. 1 is a perspective view of a front vehicle body reinforcing structure according to an exemplary embodiment of the present disclosure.
Figure 2:
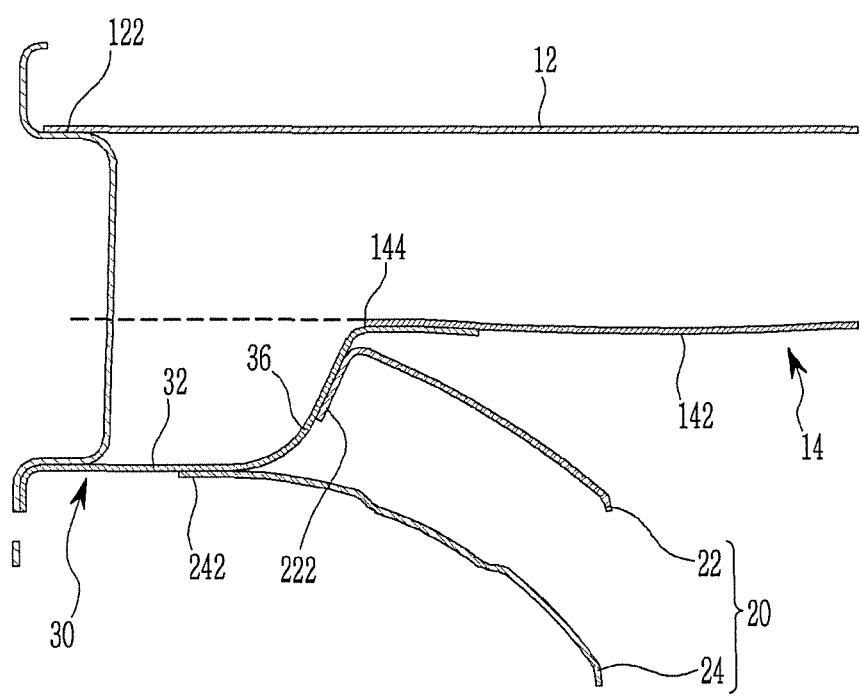
FIG. 2 is an A-A line cross-sectional view shown in FIG. 1.

Referring to FIG. 1 and FIG. 2, a front vehicle body reinforcing structure according to an exemplary embodiment of the present disclosure, may be applied to a front side member 10 formed to extend along the length direction of a vehicle and disposed left and right sides along the vehicle width direction and a fender apron member 20 disposed above the height direction of the vehicle than the front side member 10.

The front side member 10 may include a front side inner member 12 position inside the width direction of the vehicle and formed to extend along the length direction of the vehicle; and a front side outer member 14 positioned outside the width direction of the vehicle and extending along the length direction of the vehicle to engage with the front side inner member 12.

The front side inner member 12 and the front side outer member 14 may be coupled to each other to form a closed cross section of a substantially rectangular shape.

The front end portion 144 of the front side outer member 14 along the length direction of the vehicle may be partially cut to form a cut-away portion and the side outer member 30 may be coupled to the cut-away portion by welding or the like.

The side outer member 30 may include an outer surface 32 along the width direction of a vehicle; an upper surface 34 bent inwardly along the width direction of a vehicle and extended from the upper edge of the outer surface 32 along the height direction of a vehicle, and disposed at an upper side along the height direction of a vehicle; and a lower surface bent inwardly along the width direction of a vehicle and extended from the lower edge of the outer surface 32 along the height direction of a vehicle, disposed at a lower side along the height direction of a vehicle and parallel to the upper surface 34, so that the side outer member 30 may include a substantially U-shaped cross section.

The side outer member 30 may include a slanted surface 36 that is inclined rearward along the length direction of the vehicle from the outer side 32 and inward in the width direction of the vehicle.

The rear end of the slanted surface 36 along the length direction of the vehicle may be coupled to the front side outer member 14 by welding or the like.

The width of the side outer member 30 along the width direction of the vehicle may be larger than that of the front side outer member 14, so that, when the side outer member 30 is engaged with the cut-away portion of the front side outer member 14, the outer surface 32 may be located outside the outer surface 142 of the front side outer member 14 along the vehicle width direction. (Referring to FIG. 2)

The fender apron member 20 may include a fender apron inner member 22 located on the inner side along the width direction of the vehicle and a fender apron outer member 24 located outside along the width direction of the vehicle.

The front end portions of the fender apron inner member 22 and the fender apron outer member 24 along the length direction of the vehicle may be positioned rearward along the length direction of the vehicle than the front end portion 122 of the front side inner member 12 along the length direction of the vehicle.

The front end portion of the fender apron inner member 22 along the length direction of the vehicle may be bent outward in the width direction of the vehicle to form a coupling flange 222, which is joined to the slanted surface 36 of the side outer member 30.

The front end portion 242 of the fender apron outer member 24 along the vehicle length direction may be joined to the outer surface 32 of the side outer member 30.

Figure 3:
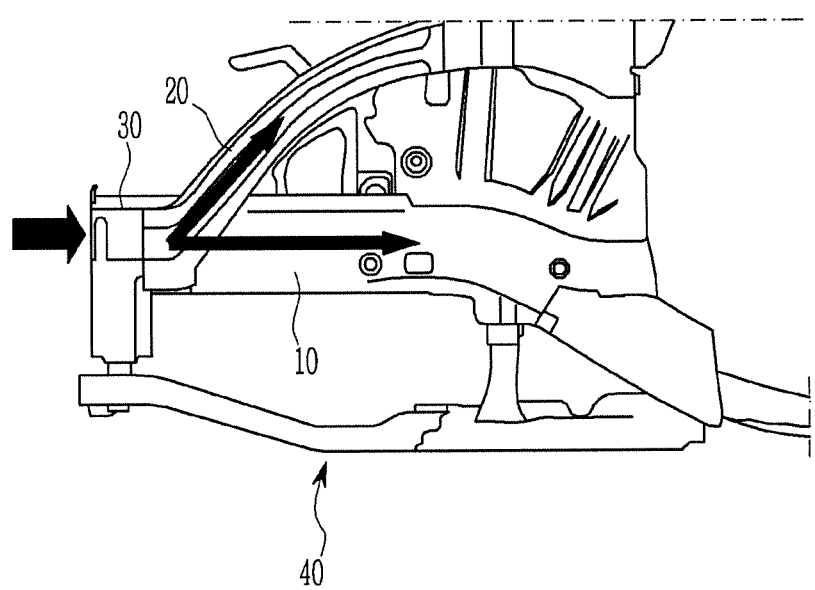
FIG. 3 is a side view of a front vehicle body reinforcing structure according to an exemplary embodiment of the present disclosure.

Referring to FIG. 3, in a state where a sub-frame 40 is mounted at the front vehicle body reinforcing structure according to an exemplary embodiment of the present disclosure, when the vehicle is subjected to a forward collision or a small overlap collision, the impact load is transmitted to the front end portion of the front side member 10 and the side outer member 30 simultaneously.

The front side member 10 receives the impact load and absorbs the impact as it is properly deformed to alleviate it.

In addition, the side outer member 30 also receives the impact load and absorbs the impact as it is properly deformed to alleviate it, and simultaneously, transmits it to the fender apron member 20, which receives the impact load through the side outer member 30 and absorbs it while being properly deformed.

Furthermore, the impact load transmitted to the front side member 10 and the fender apron member 20 are appropriately dispersed to other parts of the forward vehicle body through them, thereby improving the collision stability of the passenger.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body reinforcing structure of a vehicle comprising:
   a front side member formed to extend along a longitudinal direction of the vehicle, disposed on both right and left sides along a width direction of the vehicle, and formed by coupling a front side inner member disposed on an inner side in the width direction of the vehicle and a front side outer member disposed on an outer side in the width direction of the vehicle, wherein a front end portion of the front side outer member along the longitudinal direction of the vehicle is cut away and positioned behind a front end portion of the front side inner member along the longitudinal direction of the vehicle;
   a side outer member coupled to a cut-away portion of the front side outer member; and
   a fender apron member disposed on an upper side in a height direction of the vehicle of the front side member, and coupled to the side outer member,
   wherein the fender apron member comprises a fender apron inner member located inside along the width direction of the vehicle, and
   a front end portion of the fender apron inner member along a length direction of the vehicle is bent outwardly in the width direction of the vehicle and joined to the side outer member.

2. The front vehicle body reinforcing structure of claim 1, wherein the front side inner member and the front side outer member form a closed cross section of a rectangular shape.

3. The front vehicle body reinforcing structure of claim 1, wherein the side outer member comprises:
   an outer surface along the width direction of the vehicle;
   an upper surface bent inwardly along the width direction of the vehicle and extended from an upper edge of the outer surface along the height direction of the vehicle, and disposed at an upper side along the height direction of the vehicle; and
   a lower surface bent inwardly along the width direction of the vehicle and extended from a lower edge of the outer surface along the height direction of the vehicle, disposed at a lower side along the height direction of the vehicle and parallel to the upper surface.

4. The front vehicle body reinforcing structure of claim 3, wherein a U-shaped cross section is formed by the outer surface, the upper surface and the lower surface of the side outer member.

5. The front vehicle body reinforcing structure of claim 3, wherein the side outer member further comprises a slanted surface that is inclined to a rearward along the length direction of the vehicle from the outer surface and to an inward in the width direction of the vehicle.

6. The front vehicle body reinforcing structure of claim 5, wherein a rear end portion of the slanted surface along the length direction of the vehicle is joined to the front side outer member.

7. The front vehicle body reinforcing structure of claim 1, wherein width of the side outer member along the width direction of the vehicle is greater than width of the front side outer member, so that, when the side outer member is coupled to the cut-away portion of the front side outer member, the outer surface along the width direction of the vehicle may be located outside the outer surface of the front side outer member along the width direction of the vehicle.

8. The front vehicle body reinforcing structure of claim 5, wherein the fender apron member further comprises a fender apron outer member located outside along the width direction of the vehicle.

9. The front vehicle body reinforcing structure of claim 8, wherein the front end portion of the fender apron inner member along the length direction of the vehicle is bent outwardly in the width direction of the vehicle to form a coupling flange, and
   the coupling flange is joined to the slanted surface of the side outer member.

10. The front vehicle body reinforcing structure of claim 8, wherein the front end portion along the length direction of the vehicle of the fender apron outer member is joined to an outer surface of the side outer member along the width direction of the vehicle.

\* \* \* \* \*